March 20, 1934. H. M. DILLHOEFER Re. 19,118

CONTAINER

Original Filed Oct. 2, 1930

Inventor:
Henry M. Dillhoefer
By Geo. B. Fitts
Attorney

Reissued Mar. 20, 1934

Re. 19,118

UNITED STATES PATENT OFFICE 19,118

CONTAINER

Henry M. Dillhoefer, Cleveland Heights, Ohio

Original No. 1,929,412, dated October 10, 1933, Serial No. 486,018, October 2, 1930. Application for reissue November 13, 1933, Serial No. 697,866

9 Claims. (Cl. 220—39)

This invention relates to a container having at least one wall that is formed of sheet metal of any desired gauge; more particularly the invention relates to a bung ring and its mounting in the sheet metal wall of a container.

As illustrating one application of my invention, I have shown a container having its side walls and heads made of sheet metal stock.

One object of the invention is to provide an improved process of mounting a bung ring in a sheet metal wall.

Another object of the invention is to provide an improved container having a mounting for a bung ring, whereby the latter may be rigidly secured in position.

Another object of the invention is to provide an improved bung ring and mounting therefor, so constructed and arranged that the bung ring may be readily positioned in its mounting and secured against turning and dislocation.

A further object of the invention is to mount a bung ring in a container wall in a ready and economical manner and without resorting to welding.

A further object of the invention is to provide a combined bung ring mounting and sealing means therefor so related that the sealing device may be readily applied.

Other objects of the invention will be apparent to those skilled in the art to which my invention relates from the following description taken in connection with the accompanying drawing, wherein Fig. 1 is a fragmentary section of a container showing a bung ring and its mounting, embodying my invention, incorporated in the container head.

Figure 1:
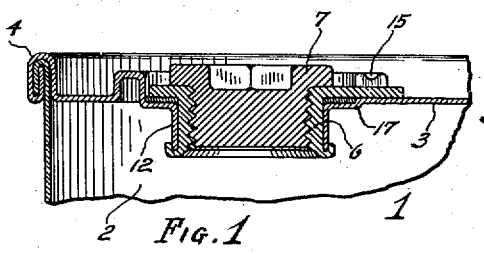

In the drawing, 1 indicates as an entirety a container having side walls and heads, portions thereof being indicated at 2, 3, respectively, and suitably connected, as by a double seam 4. 5 indicates as an entirety a bung ring having a body portion 6 that is threaded internally to receive a plug 7 or other threaded device. The body portion is provided at its outer end with a flange 8 and at spaced points circumferentially (preferably at uniform distances) the latter is provided with radial extensions or wings 9, the purpose of which will later appear. These wings are in the plane of the flange 8 and lie flat in face to face relation to the head 3, except that certain of their free ends may be bent upwardly as will hereinafter appear. At its inner end, the body portion 6 is provided with a relatively thin annular portion 10, which is bent laterally as will be later set forth.

Figure 2:
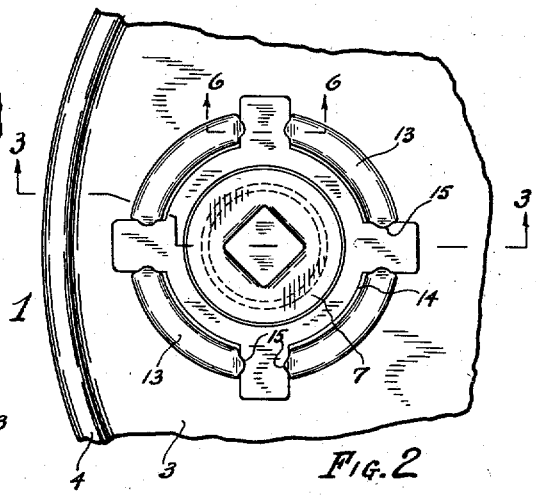
Fig. 2 is a plan view of the parts shown in Fig. 1.
Figure 3:
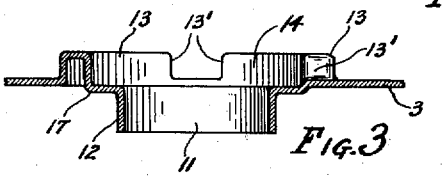
Fig. 3 is a section through the head on the line 3—3 of Fig. 2 and illustrating the first step of my process and the construction of the head ready to receive a bung ring.
Figure 4:
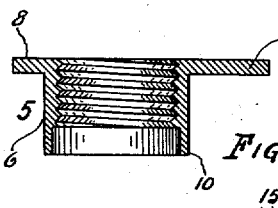
Fig. 4 is a section through the bung ring on the line 3—3 of Fig. 2.
Figure 6:
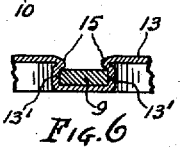
Fig. 6 is a section on the line 6—6 of Fig. 2.
Figure 5:
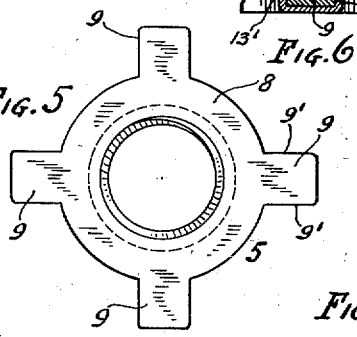
Fig. 5 is a plan view of the bung ring.

In carrying out my process of securing a bung in position, which process is carried out before the side wall 2 and head 3 are seamed, I form an opening 11 in the head 3 and then distend the metal around the opening downwardly to form a depending neck or collar 12; also, surrounding the opening 11 but at points remote therefrom I distend the metal of the head in the opposite direction, that is, upwardly, as shown at 13, to provide a plurality of pairs of opposed abutments 13′, the inner side walls of which co-operate to form an annular seat 14. The foregoing steps may be performed separately or otherwise by suitable tools. The distended portions are disposed concentrically to the opening formed by the neck. Their inner side walls are spaced from the neck 12 a distance substantially equal to the width of the flange 8 to form the seat 14 and their opposed end walls form the abutments 13. Next, a bung 5 of the construction above described is positioned in the neck 12. When the bung is thus positioned, the seat 14 receives the annular flange 8, whereas each extension 9 fits between a pair of abutments 13′, as shown in Figs. 1 and 2. Next, the abutments 13′ are up-set or bent over and upon the extensions as shown at 15 and the annular portion 10 is up-set or riveted over the free circumferential edge of the neck 12, as shown in Fig. 1.

In my construction, the up-set abutments and up-set portion 10 co-operate to secure the bung ring to the wall 3 and in its seat 14, whereas the abutments also prevent rotative movement of the bung ring. As the walls of those portions of the metal, that are distended to provide each abutment, are integral with the head, each abutment is reinforced to resist any force acting on the bung ring to rotate it in its seat.

In the preferred construction each extension 9 has parallel sides 9′ and exactly fits between a pair of opposed abutments 13′ and the latter are parallel and disposed equal distances from a radius struck from the center of the opening 11; also, the distended portions may have substantially vertical side walls curved concentric to the opening 11. Where the pairs of abutments are spaced substantially 90° apart, as shown in Fig. 2, each distended portion extends from one abutment of one pair to the adjacent abutment of the adjoining pair so that the opposite end walls of the distended portion form the abutments just referred to. This construction insures the ready positioning of a bung ring in the neck 12 and seat 14.

Figure 7:
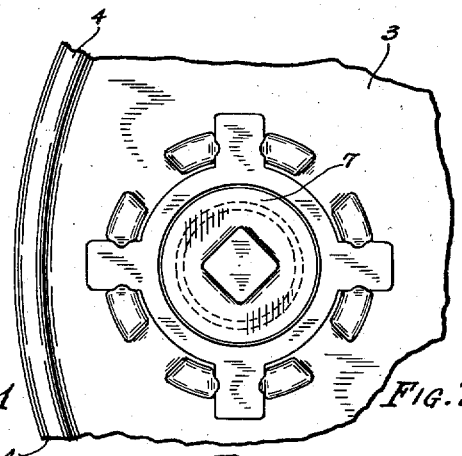
Fig. 7 is a plan view similar to Fig. 2, but illustrating a slightly different form of construction embodying my invention.

In the form of construction shown in Fig. 7, the distended portions 13 are shorter in length measured between two abutments and may be proportioned to provide twice as many pairs of abutments as that shown in Fig. 2. When the head is constructed as shown, the positioning of the bung ring is greatly facilitated.

My construction is advantageous since the bung ring is sealed at both ends to the sheet metal wall of the container and in addition thereto it is interlocked at uniformly spaced points with such wall by abutments disposed at right angles to portions or extensions of the bung flange and in the plane thereof. As the abutments are reinforced, danger of the bung ring turning is entirely eliminated. This result is more readily attained without putting undue strain on the distended portions 13 by reason of the fact that the interlocking elements are at remote points from the axis of the bung ring.

When desired a gasket 16 (of paper or other material) may be interposed between the flange 8 and metal of the head; and if desired the metal may be offset, as shown at 17 to receive the gasket.

Figure 8:
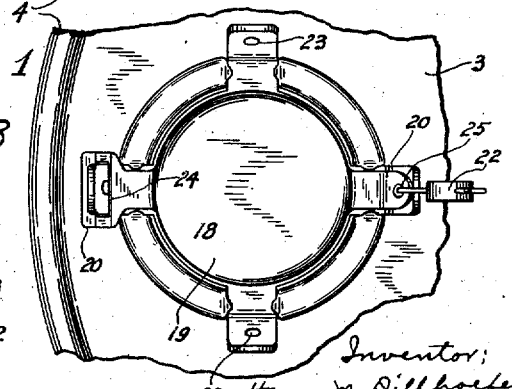
Fig. 8 is a plan view showing the application of a sealing means.
Figure 9:
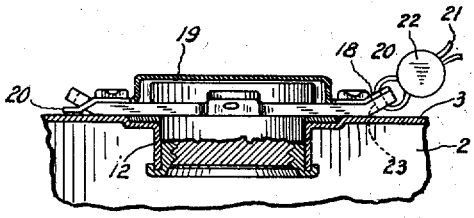
Fig. 9 is a section on the line 9—9 of Fig. 8.

18 indicates as an entirety a sealing means for the plug 7, whereby the latter cannot be removed or tampered with without breaking the seal or otherwise indicating such tampering. The sealing means comprises a member 19 having wings 20 connected to diametrically arranged extensions 9. The member 19 extends across the plug 7, one wing being interlocked with the adjacent extension 9 and the other wing being connected to the adjacent extension 9 by a wire 21 the ends of which are sealed by the slug 22. To readily provide for the sealing, each extension is preferably formed with an opening 23. The sealing member 19 preferably comprises an inverted cup which encloses the head or top of the plug 7. One wing 20 is enlarged and transversely slotted, as shown at 24, to receive the free end of the adjacent extension 9, which end is bent upwardly and the free end of the wing is bent downwardly to permit these parts to be interlocked, as shown in Figs. 8 and 9. The other, diametrically arranged wing is formed with an opening 25 which registers with the opening 23 in the adjacent extension when the member 19 is positioned in the manner described, whereby the wire 21 may be passed through the openings 23, 25 and its ends sealed with the slug 22.

The free ends of the extensions may be bent upwardly, as shown in Fig. 8, or they may be positioned flat against the head 3, and two of them bent upwardly with a suitable tool when the seal is to be applied.

While my construction of sealing means is effective, to prevent access to the container, its application and removal does not mutilate the container, bung ring mounting or closing plug, and the latter may be sealed as often as desired.

The sealing member may be formed of thin sheet metal stock and lends itself to economical production.

To those skilled in the art to which my invention relates many changes in construction and widely differing embodiments and applications of the invention will suggest themselves without departing from the spirit and scope of the invention. My disclosures and the description herein are purposely illustrative and are not intended to be in any sense limiting.

What I claim is:

1. A container having a sheet metal wall formed with an opening and provided with a depending neck surrounding said opening and a plurality of arc-shaped portions distended in the upward direction and disposed in a circular arrangement concentric to said opening and forming between them pairs of spaced abutments, and a bung ring fitting into said neck and having at its outer end radial extensions fitting between and engaging said abutments, said abutments being riveted over or upon said extensions.

2. A container having a sheet metal wall formed with an opening and provided with a depending neck surrounding said opening and a plurality of arc-shaped portions distended upwardly and disposed in a circular arrangement concentric to said opening and forming between them pairs of spaced abutments, and a bung ring fitting into said neck and having at its inner end a circumferential portion riveted over the free circumferential edge of said neck and at its outer end radial extensions fitting between and engaging said abutments, said abutments being riveted over or upon said extensions.

3. A container having a sheet metal wall formed with an opening and provided with a depending neck surrounding said opening, the metal of the wall having a plurality of upwardly distended arc-shaped portions disposed on an imaginary circle concentric to and spaced from the wall of said neck, the inner side walls of said portions forming a seat and their end walls extending substantially radially of the axis of said opening, each end wall of said distended portions being spaced from the opposed end wall of the adjacent portion, and a bung ring fitting into said neck and having at its inner end a circumferential portion riveted over the free circumferential edge of said neck and at its outer end a flange arranged to engage the face of said wall and seated within said distended portions and said flange having spaced radial extensions disposed in the plane of the flange and fitting between and engaging the opposed end walls of each two adjoining distended portions, the upper portion of each end wall being bent over and upon the adjacent extension and co-operating with said riveted over circumferential portion to secure the bung ring in its seat.

4. A container having a sheet metal wall formed with an opening and a laterally extending neck surrounding said opening and a plurality of circumferentially arranged portions up-set laterally in a direction opposite to said neck, the end walls of said up-set portions forming diametrically arranged pairs of substantially radially extending opposed abutments in relatively close opposed relation, and the inner walls of said up-set portions co-operating to form a substantially annular seat for the flange of a bung ring, and a bung ring having a body portion fitting into said neck, one end of said body portion being provided with an outwardly extending flange fitting said seat and said flange having on its periphery a plurality of radial extensions fitting between the pairs of opposed abutments, respectively.

5. A container as claimed in claim 4 in which the radial extensions are in diametrical relation and extend beyond the up-set portions and a sealing device is fitted over the element adapted to be mounted in said bung ring and connected to the outer end portions of two diametrical extensions.

6. A container as claimed in claim 4 in which the radial extensions are in diametrical relation and a sealing device is fitted over the element adapted to be mounted in said bung ring, said device having an interlocking detachable connection with one extension and a sealed connection with the diametrical extension.

7. A container having a sheet metal wall formed with an opening and a laterally extending neck surrounding said opening and circumferentially arranged off-set portions around said neck, said off-set portions being shaped to form diametrically arranged pairs of substantially radially extending abutments in relatively close opposed relation, and the walls of said portions between adjacent pairs of abutments cooperating to form a substantially annular seat for the flange of a bung ring, and a bung ring having a body portion fitting into said neck, one end of said body portion being provided with an outwardly extending flange fitting said seat and said flange having on its periphery a plurality of radial extensions fitting between the pairs of opposed abutments, respectively.

8. A container having a sheet metal wall formed with an opening and a laterally extending neck surrounding said opening and circumferentially arranged off-set portions around said neck, said off-set portions being shaped to form diametrically arranged pairs of substantially radially extending abutments in relatively close opposed relation, and the walls of said portions between adjacent pairs of abutments cooperating to form a substantially annular seat for the flange of a bung ring, and a bung ring having a body portion fitting into said neck, one end of said body portion being provided with an outwardly extending flange fitting said seat and said flange having on its periphery a plurality of radial extensions fitting between the pairs of opposed abutments, respectively, the depth of said off-set portions being greater than the thickness of said ring flange.

9. A container having a sheet metal wall formed with an opening, and having a ring shaped flat portion surrounding said opening and bounded by relatively long arc shaped portions having at their ends outwardly extending abutments, a bung ring comprising a cylindrical portion extending through said opening and provided with an outwardly extending circular flange engaging said flat portion, said flange having on its periphery relatively narrow extensions disposed between said abutments.

HENRY M. DILLHOEFER.